US011832216B2

United States Patent
Kumar et al.

(10) Patent No.: US 11,832,216 B2
(45) Date of Patent: Nov. 28, 2023

(54) METHOD AND DEVICE FOR HANDLING PAGING MESSAGES WITH NON-3GPP ACCESS AS DECISION POINT

(71) Applicant: Samsung Electronics Co., Ltd., Suwon-si (KR)

(72) Inventors: Lalith Kumar, Bangalore (IN); Kundan Tiwari, Bangalore (IN); Varini Gupta, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/362,575

(22) Filed: Jun. 29, 2021

(65) Prior Publication Data
US 2022/0007330 A1    Jan. 6, 2022

(30) Foreign Application Priority Data

Jun. 29, 2020 (IN) .............................. 202041027598
Jun. 23, 2021 (IN) .............................. 202041027598

(51) Int. Cl.
*H04W 68/02*     (2009.01)
*H04W 76/19*     (2018.01)
(Continued)

(52) U.S. Cl.
CPC .............. *H04W 8/02* (2013.01); *H04W 8/18* (2013.01); *H04W 48/08* (2013.01); *H04W 76/19* (2018.02); *H04W 88/06* (2013.01)

(58) Field of Classification Search
CPC ... H04W 48/08; H04W 68/005; H04W 68/02; H04W 76/18; H04W 76/19; H04W 8/18; H04W 88/06
See application file for complete search history.

(56) References Cited

U.S. PATENT DOCUMENTS 10,813,044 B2 * 10/2020 Kavuri .................. H04W 60/06

2014/0274006 A1 * 9/2014 Mutya ..................... H04W 4/16
455/416

(Continued)

FOREIGN PATENT DOCUMENTS

WO    WO-2018208283 A1 * 11/2018 .............. H04W 4/14
WO    WO-2020030731 A1 * 2/2020 ........... H04L 63/164

OTHER PUBLICATIONS

International Search Report of the International Searching Authority in connection with International Application No. PCT/KR2021/008183 dated Oct. 8, 2021, 5 pages.
(Continued)

*Primary Examiner* — Dung Hong

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Embodiments herein disclose a method of handling a paging message on a multi-subscriber identity module (SIM) user equipment (UE), the method comprising: receiving a paging message over a 3GPP access for a pending downlink data, wherein the pending downlink data is to be sent over a non-3GPP access; determining whether to re-establish user-plane resources over a 3GPP access using at least one protocol data unit (PDU) session of the non-3GPP access based on the paging message; and performing one of: responding to the paging message in response to determining that the user-plane resources are to be re-established using at least one PDU session of the non-3GPP access over the 3GPP access and not responding to the paging message in response to determining the user-plane resources are not to be re-establish using at least one PD U session of the non-3GPP access over the 3GPP access.

12 Claims, 12 Drawing Sheets

(51) Int. Cl.
  *H04W 48/08* (2009.01)
  *H04W 8/18* (2009.01)
  *H04W 88/06* (2009.01)
  *H04W 8/02* (2009.01)

(56) References Cited

U.S. PATENT DOCUMENTS

| | | |
|---|---|---|
| 2018/0255450 A1 | 9/2018 | Kumar et al. |
| 2019/0007992 A1 | 1/2019 | Kim et al. |
| 2019/0335418 A1 | 10/2019 | Stojanovski et al. |
| 2020/0053603 A1* | 2/2020 | Huang-Fu ............. H04W 76/11 |
| 2020/0196375 A1 | 6/2020 | Ryu et al. |
| 2020/0275511 A1* | 8/2020 | Liu ...................... H04W 76/18 |
| 2020/0305118 A1* | 9/2020 | Ryu ...................... H04W 76/10 |
| 2021/0410107 A1* | 12/2021 | Park ...................... H04W 76/27 |
| 2022/0078871 A1* | 3/2022 | Won ...................... H04W 76/19 |

OTHER PUBLICATIONS

Oppo, "Network triggered service request procedure over non-3GPP access", 3GPP TSG-CT WG1 Meeting #123-e, C1-202324, Electronic meeting, Apr. 16-24, 2020, 11 pages.
Intellectual Property India, "Examination report under sections 12 &13 of the Patents Act," dated Mar. 22, 2022, in connection with Indian Patent Application No. 202041027598, 5 pages.

\* cited by examiner

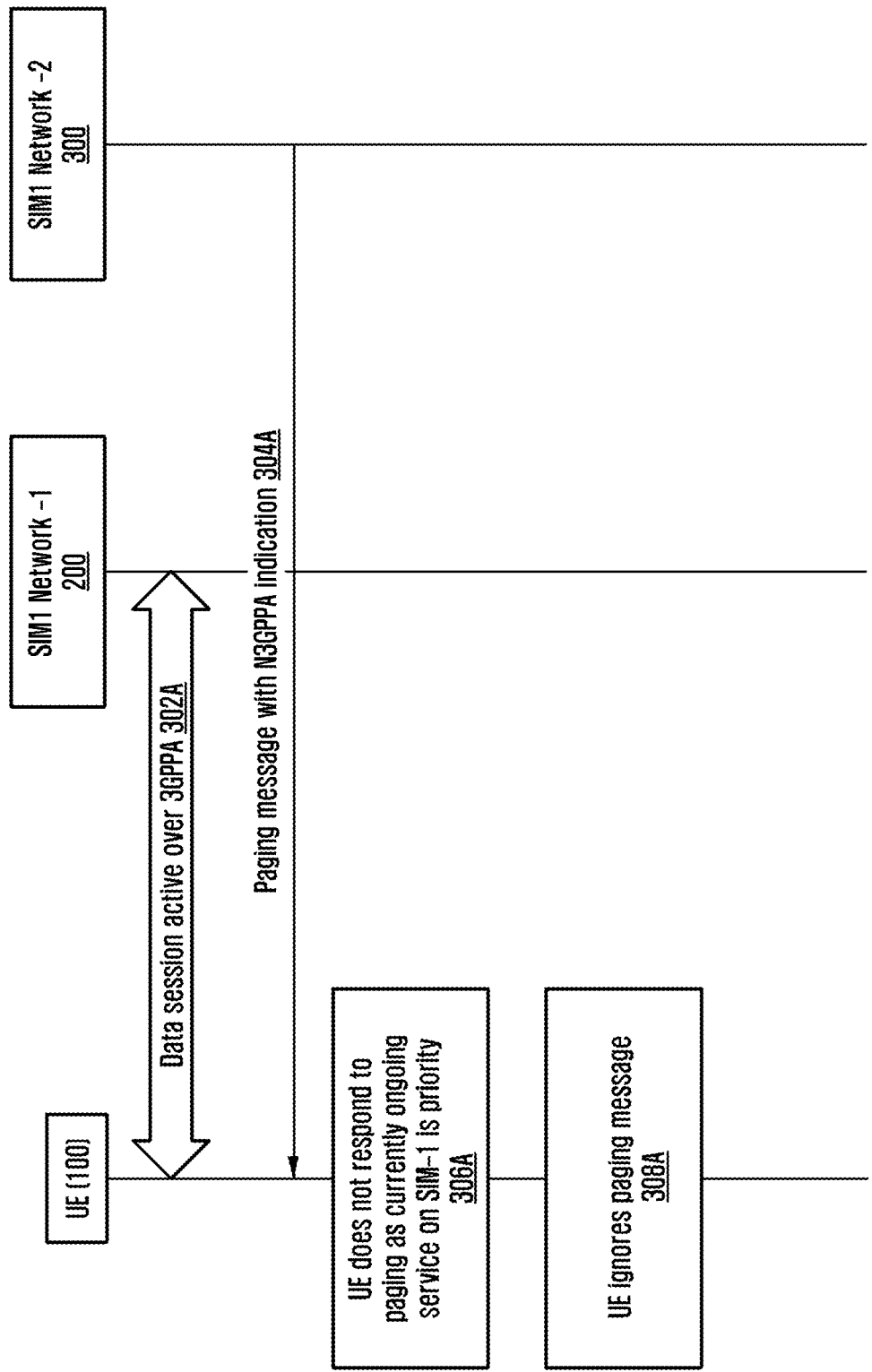

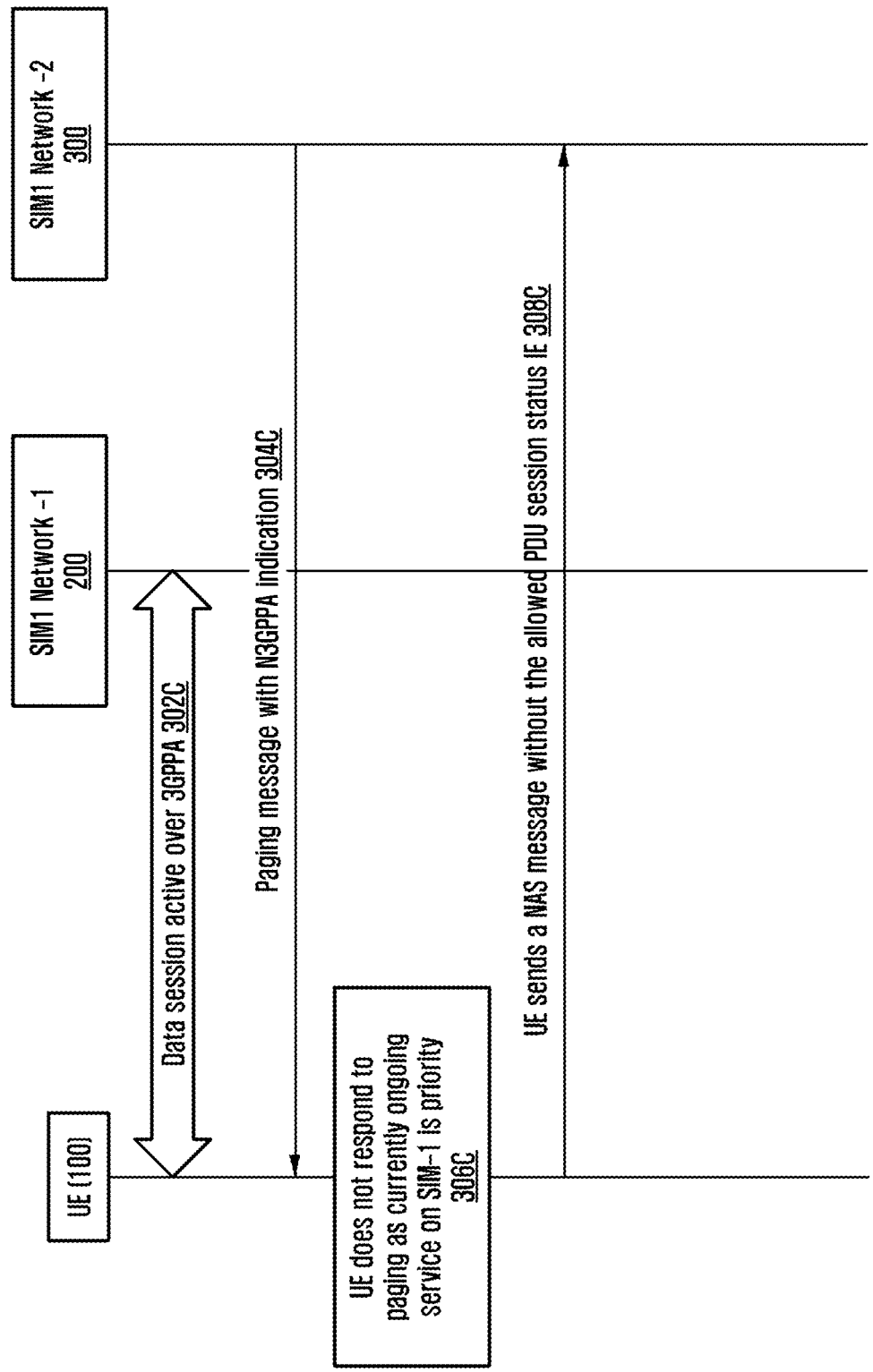

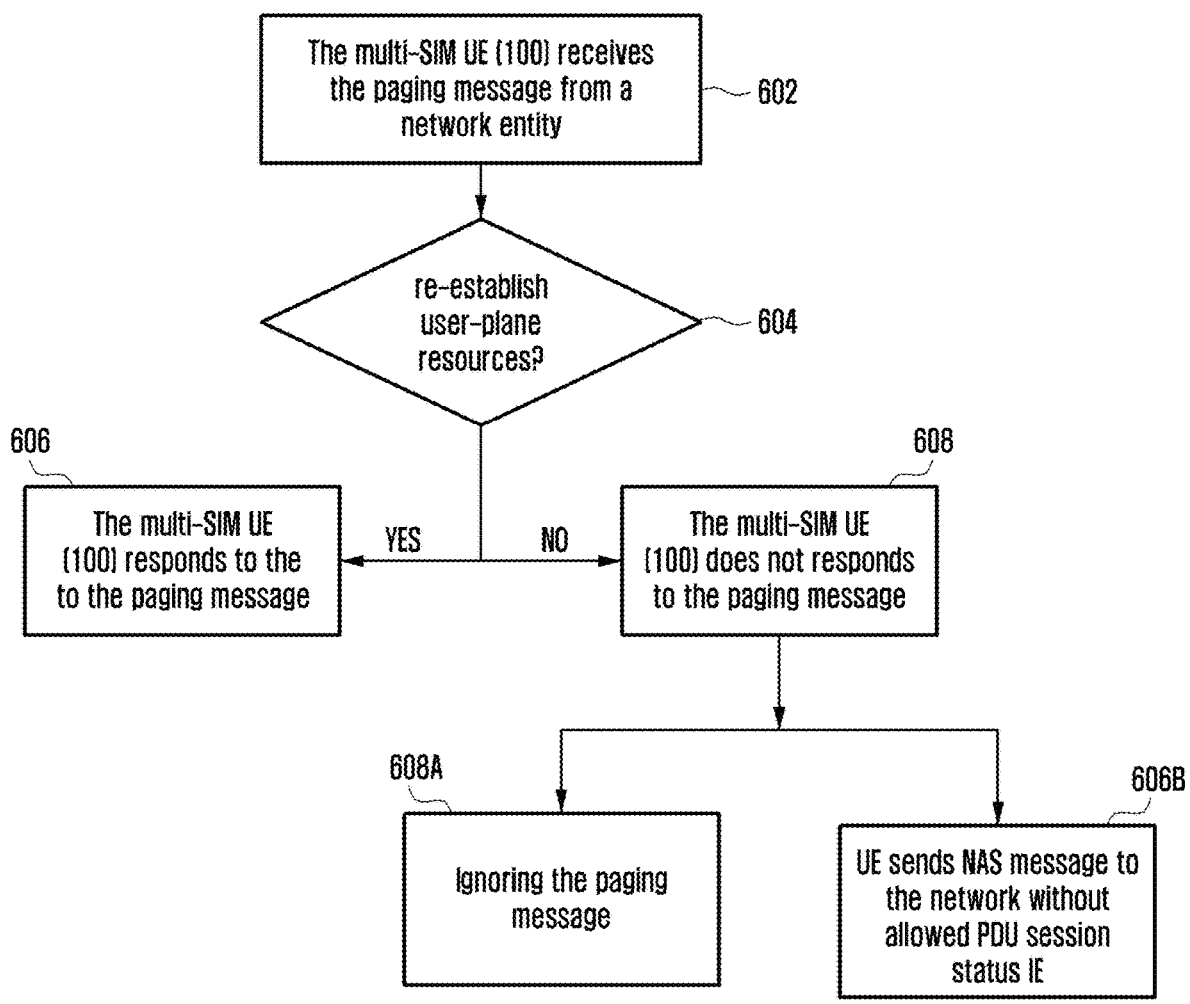

METHOD AND DEVICE FOR HANDLING PAGING MESSAGES WITH NON-3GPP ACCESS AS DECISION POINT

CROSS-REFERENCE TO RELATED APPLICATIONS

This application is based on and claims priority under 35 U.S.C. § 119(a) to Indian Provisional Patent Application No. 202041027598 filed on Jun. 29, 2020, and Indian Non-Provisional Patent Application No. 202041027598 filed on Jun. 23, 2021 in the Indian Patent Office, the disclosures of which are herein incorporated by reference in their entirety.

BACKGROUND

1. Field

The present disclosure relates to paging messages in a wireless network and more specifically relates to method and device for handling paging messages with non-3GPP Access.

2. Description of Related Art

To meet the demand for wireless data traffic having increased since deployment of communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

With advancement in technology, a multi-subscriber identity module (SIM) user equipment (UEs) are widely used to obtain benefit of services from various operators. Consider a multi-SIM UE having a single receiver and a transmitter or the multi-SIM UE having a dual receiver and a single transmitter. The multi-SIM UE is in connected mode using services on a first SIM of the multi-SIM UE over the 3GPP access. The multi-SIM UE receives paging from network for a second SIM. The multi-SIM UE does not have knowledge of what kind of service is pending for the second SIM. Thus, the multi-SIM UE responds to paging over the 3GPP access and gets into connected mode over the 3GPP access by discontinuing the service ongoing on the first SIM. After getting into the connected mode, the multi-SIM UE realizes the service on the second SIM is not a priority one compared to the service which was ongoing on the first SIM. Thus, the multi-SIM UE may have to abandon the service on the second SIM and fallback to service on the first SIM over the 3GPP access. This may have a considerable impact on the service (for example reduced throughput) on the first SIM on UE side. At the same time network may face considerable resources wastage.

The principal object of the embodiments herein is to provide a method and a device for handling non-3GPPA paging messages, based on a non-3GPPA indication or information in the paging message.

Another object of the embodiment herein is to decide whether to accept, reject or ignore the paging message based on the information in the paging message.

SUMMARY

Accordingly the embodiments herein disclose a method for handling a paging message on a multi-SIM UE in a wireless communication network, the method comprising receiving, by the multi-SIM UE (100) from a network entity, a paging message over a 3GPP access for a pending downlink data, wherein the pending downlink data is to be sent over a non-3GPP access; determining, by the multi-SIM UE, whether to re-established user-plane resources over a 3GPP access using at least one protocol data unit (PDU) session of the non 3GPP access based on the paging message; and performing by the multi-SIM UE, one of: responding to the paging message in response to determining that the user-plane resources are to be re-established using at least one PDU session of the non-3GPP access over the 3GPP access; and not responding to the paging message in response to determining the user-plane resources are not to be re-establish using at least one PDU session of the non-3GPP access over the 3GPP access.

In an embodiment, the multi-SIM UE is in an idle state over the 3GPP access and the non-3GPP access.

In an embodiment, the paging message comprises a non-3GPP access type information about the pending downlink data or signaling over the non-3GPP access.

In an embodiment responding to the paging message comprises sending by the multi-SIM UE (100), a non-access stratum (NAS) message to the network entity, wherein the NAS message comprises an allowed PDU session status information element to indicate the at least one PDU session of non-3GPP access for which the UE allows the user-plane resources to be re-established over 3GPP access.

In an embodiment, not responding to the paging message comprises performing, by the multi-SIM UE (100) one of: ignoring the received paging message; and sending a NAS message to the network entity, wherein the NAS message does not include an allowed PDU session status IE to indicate at least one PDU session of non-3GPP access for which the UE allows the user-plane resources to be re-established over 3GPP access.

Accordingly, the embodiment herein describe a multi-SIM UE in a wireless communication network for handling a paging message, the multi-SIM UE comprising a memory, a processor, a communicator coupled with the processor and configured to receive from a network entity, a paging message over a 3GPP access for a pending downlink data, wherein the pending downlink data is to be sent over a non-3GPP access; determine whether to re-establish user-plane resources over a 3GPP access using at least one PDU session of the non 3GPP access based on the paging message; and perform by the multi-SIM UE (100), one of: responding to the paging message in response to determining that the user-plane resources are to be re-established using at least one PDU session of the non-3GPP access over the 3GPP access; and not responding to the paging message in response to determining the user-plane resources are not to be re-establish using at least one PDU session of the non-3GPP access over the 3GPP access.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3A illustrates a sequence diagram illustrating a method of handling the paging message received on the second SIM of the UE according to an embodiment of the present disclosure;

FIG. 3C illustrates a sequence diagram illustrating a method of handling the paging message received on the second SIM of the UE according to an embodiment of the present disclosure;

FIG. 6 is a flow diagram illustrating the method of handling paging message in a wireless communication network according to an embodiment of the present disclosure.

DETAILED DESCRIPTION

Figure 1A:
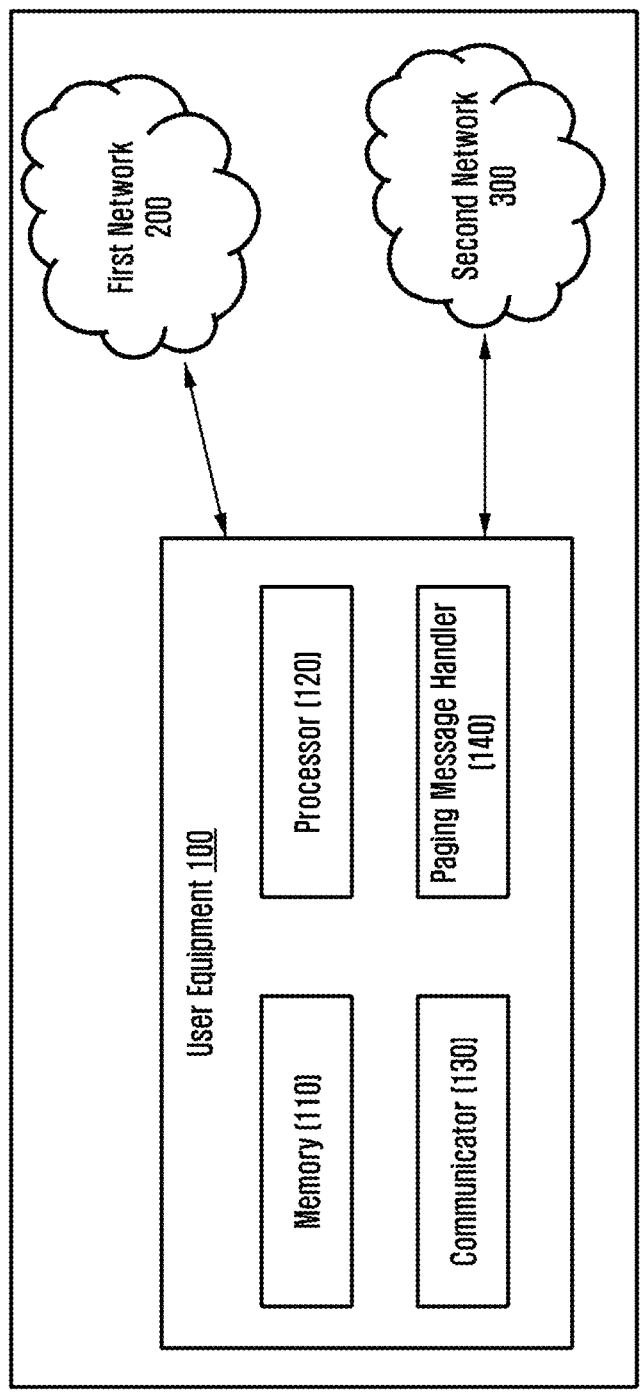
FIG. 1A illustrates a block diagram of a UE communicating with a first network and a second network over a first SIM and a second SIM respectively according to an embodiment of the present disclosure.

FIGS. 1A through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a method and device for handling paging messages over non-3GPPA based on information present in the paging message.

In general, the multi USIM UEs have multiple protocol stacks, each protocol stack is related to respective subscription (SIM credentials) and communicates with the network based on the subscription information available for that respective stack. Thus, in this embodiment Multi SIM UE or SIM-1 receives or sends implies that stack of SIM-1 in the MUSIM UE is communicating with respective network. i.e., In this embodiment, the terms SIM-1 and SIM-2 refers to respective protocol stack within MUSIM UE responsible for communicating with their respective network. The explanation is only taking into account active SIM-1 and SIM-2 but the same idea can be applied when MUSIM UE is having any active plurality of SIMS i.e., for more than 2 active USIMs.

In an embodiment, the UE receives a paging message from the network over a 3GPP access. The paging message comprises a non-3GPPA access type indication. Based on the paging message, the UE determines the paging message is to be re-established over the 3GPP access using at least one PDU session of the non 3GPP access. Further the UE either accepts or rejects the paging message based on the determining.

Unlike existing methods and systems, the provided method does not create throughput issues to the SIM-1 network stack of the UE, SIM-2 network resources are not wasted, user experience is not hampered.

Referring now to the drawings, and more particularly to FIGS. 1A, 1B, 2 through 6 where similar reference characters denote corresponding features consistently throughout the figures, there are shown preferred embodiments.

FIG. 1A illustrates a block diagram of a User Equipment UE (100) communicating with a first network (200) and a second network (300) and wherein the UE (100) handles the paging message received from the first network (200) and the second network (300) according to an embodiment of the present disclosure.

As illustrated in FIG. 1A, the UE (100) is a multi-SIM UE and comprises a first SIM (150) and a second SIM (160). The UE (100) is communicating with the first network (200) via the first SIM (150). The UE (100) is communicating with the second network (300) via the second SIM (160). In an embodiment, the first SIM (150) and the second SIM (160) may be connected to the same network or different networks.

The UE (100) may be, for example, but not limited to, social robot, a smart watch, a cellular phone, a smart phone, a personal digital assistant (PDA), a tablet computer, a laptop computer, an Internet of things (IoT) device, a smart speaker, an artificial intelligent (AI) device or the like.

In an embodiment, the first network (200) may be, for example but not limited to a 5$^{th}$ generation (5G) network, a 6$^{th}$ generation (6G) network, a non-terrestrial wireless network or the like.

In an embodiment, the second network (300) may be, for example but not limited to 5G network, a 6G network, a non-terrestrial wireless network or the like.

In an embodiment, the UE (100) includes a memory (110), a processor (120), a communicator (130), the paging message handler (140), the first SIM (150) and the second SIM (160).

The memory (110) in the UE (100) is responsible for storing information received from the first SIM (150) and the second SIM (160) and different instructions which are to be executed by the processor (120) for handling the paging message. The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110 may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in random access memory (RAM) or cache). The memory (110) can be an internal storage unit or it can be an external storage unit of the UE (100), a cloud storage, or any other type of external storage.

In an embodiment, the processor (120) communicates with the memory (110), the communicator (130), and the paging message handler (140). The processor (120) is configured to execute instructions stored in the memory (110) for determining rogue AP and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an artificial intelligence (AI) dedicated processor such as a neural processing unit (NPU).

In an embodiment, the communicator (130) is configured for communicating internally between internal hardware components and with external devices via one or more networks such as the first network (200) and the second network (300). The communicator (130) includes an electronic circuit specific to a standard that enables wired or wireless communication.

In an embodiment, the paging message handler (140) is responsible for handling the paging message received on the SIM 2 (160) while the UE (100) is in connected mode over the first SIM (150) with the first network (200).

In an embodiment, the paging message handler (140) determines that the UE (100) is in connected mode over the first SIM and is in an idle mode over the second SIM and is communicating with the first network (200) via the first SIM (150) over a 3GPPP access. Further, the paging message handler (140) determines that a downlink user data is pending to be sent over a non-3GPPA (N3GPPA) for the second SIM. In an embodiment, the UE (100) receives a paging message for the pending user data for the second SIM. The paging message comprises information about the non-3GPP access type indication. Based on the information in the paging message, the paging message handler (140) determines whether the pending user data is important over the non-3GPPA or not. By determining whether the pending data is important or not, the paging message handler (140) determines whether to re-established user-plane resources over the 3GPP access using at least one PDU session of the non 3GPP access based on the paging message.

Further, if the paging message handler (140) determines that the pending downlink data over the non-3GPP access is not important and the user-plane resources are not to be established then the UE (100) ignores and does not send any service request or registration request message to the network or sends a NAS message like service request message or the registration request message without including the allowed PDU session status IE. In an embodiment, the paging message handler (140) determines that the UE (100) does not want to move any of the PDU session from non-3GPP access type to 3GPP access by impacting ongoing services on the first SIM (150) and hence the UE does not send any registration or service request message in response to the paging message, or alternatively UE sends a NAS message like service request message or the registration request message without including the allowed PDU session status IE. Given that allowed PDU session status IE is not available in the NAS message, network may not re-establish user-plane resources over the 3GPP access using at least one Protocol Data Unit (PDU) session of the non 3GPP access.

In another embodiment, if the paging message handler (140) determines that the pending downlink data over the non-3GPP access is important and user-plane resources are to be re-established using the at least one PDU session, then the UE (100) responds to the paging message and sends a registration request message or service request message by including the allowed PDU session status IE. In an embodiment, the paging message handler (140) determines that the UE (100) wants to move some of the PDU session from non-3GPP access type to 3GPP access by impacting ongoing services on the first SIM (150) and hence the UE does send the registration message or the service request message in response to the paging message by including the allowed PDU session status IE. After receiving the allowed PDU session status IE, network may not establish user-plane resources over the 3GPP access using at least one Protocol Data Unit (PDU) session of the non 3GPP access which are indicated in allowed PDU session status IE. In an embodiment, the UE (100) may be in the connected state with the second network (300) via the second SIM (160) over the 3GPPA and receive the paging message with non-3GPPA type indication on the first SIM (150).

In another embodiment, the UE (100) may be in an idle state over the 3GPPA and in an idle state over non-3GPPA.

The paging message handler (140) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

Although the FIG. 1A shows various hardware components of the UE (100) but it may be understood that other embodiments are not limited thereon. In other embodiments, the UE (100) may include less or more number of components. Further, the labels or names of the components are used only for illustrative purpose and does not limit the scope of the present disclosure. One or more components can be combined together to perform same or substantially similar function to handling paging messages.

Figure 1B:
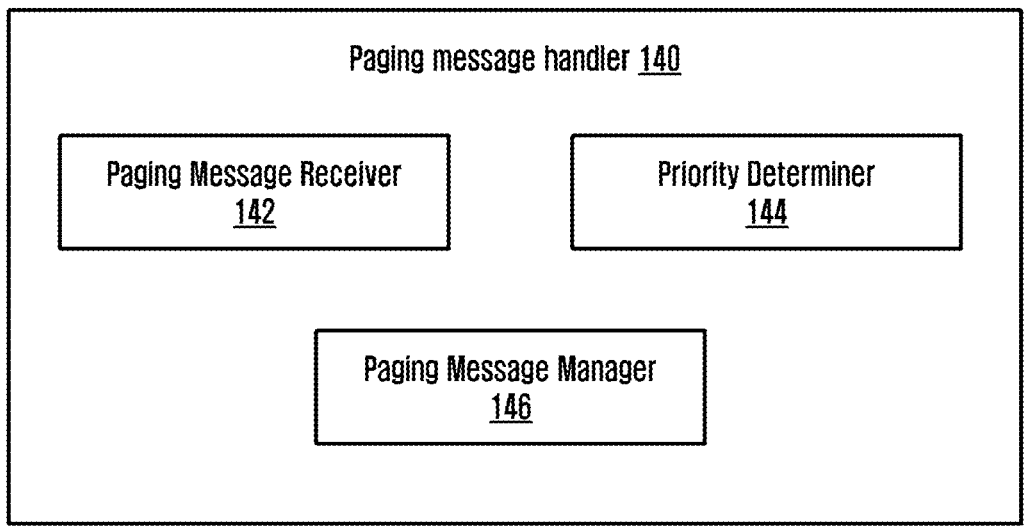
FIG. 1B illustrates a block diagram of a paging message hander for handling paging message received on the second SIM of the UE according to an embodiment of the present disclosure.

FIG. 1B illustrates a block diagram of the paging message handler (140) for handling paging messages, according to an embodiment as disclosed herein.

In an embodiment, the paging message determiner (140) comprises a paging message receiver (142), a priority determiner (144), and the paging message manager (146).

In an embodiment, the paging message receiver (142) is responsible for receiving the paging message from the second network (300) while the first SIM (150) of the UE (100) is communicating with the first network (200) over the 3GPPA. The paging message is sent in response to the pending downlink user data or signaling over the non-3GPP access. The paging message received comprises information about the non-3GPP access type indication. In an embodiment, the paging message may be received along with a paging cause. The paging cause includes information about the type of downlink user data pending.

In an embodiment, the paging message receiver (142) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

Once the paging message is received, the priority determiner (144) determines a priority of the pending downlink data to be received over the 3GPP access using at least one Protocol Data Unit (PDU) session of the non 3GPP access. In an embodiment, the priority determiner (144) determines the priority based on the information about the non-3GPPA type indication in the paging message. The priority determiner (144) makes a decision whether to respond to paging or not respond to paging message over 3GPP access based on current ongoing services on the first SIM (150) in the UE (100).

In an embodiment, the priority determiner (144) compares the pending downlink data with the ongoing service at the first SIM (150) and determines whether the priority of the pending downlink data over non-3GPPA is greater than the ongoing service at the first SIM (150) over the 3GPPA.

In an embodiment, the priority determiner (144) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

Upon receiving information about priority of the pending downlink data, the paging message manager (146), either accept or rejects the paging message.

In an embodiment, if the priority determiner (144) determines that the priority of the pending non-3GPPA type data is less than the priority of the ongoing service at the first SIM (150) then the paging message manager (146) ignores the paging messages and continues with the service at the first SIM (150) over the 3GPPA.

Whereas, if the priority determiner (144) determines that the priority of the pending downlink data/paging message is more than the priority of the ongoing service at the first SIM (150) then the paging message manager (146) responds to the paging message and send a NAS message in response to the paging message. In the registration request, the paging manager (150) sends information about non-3GPPA PDU sessions which are to be moved over the 3GPPA PDU session for execution of the pending downlink data. In an embodiment the paging manager (150) sends a non-access stratum (NAS) message in response to the paging message. The NAS message comprises an allowed PDU session status information element to indicate the at least one PDU session of non-3GPP access for which the UE allows the user-plane resources to be re-established over 3GPP access In an embodiment, the paging manager (146) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

Figure 2:
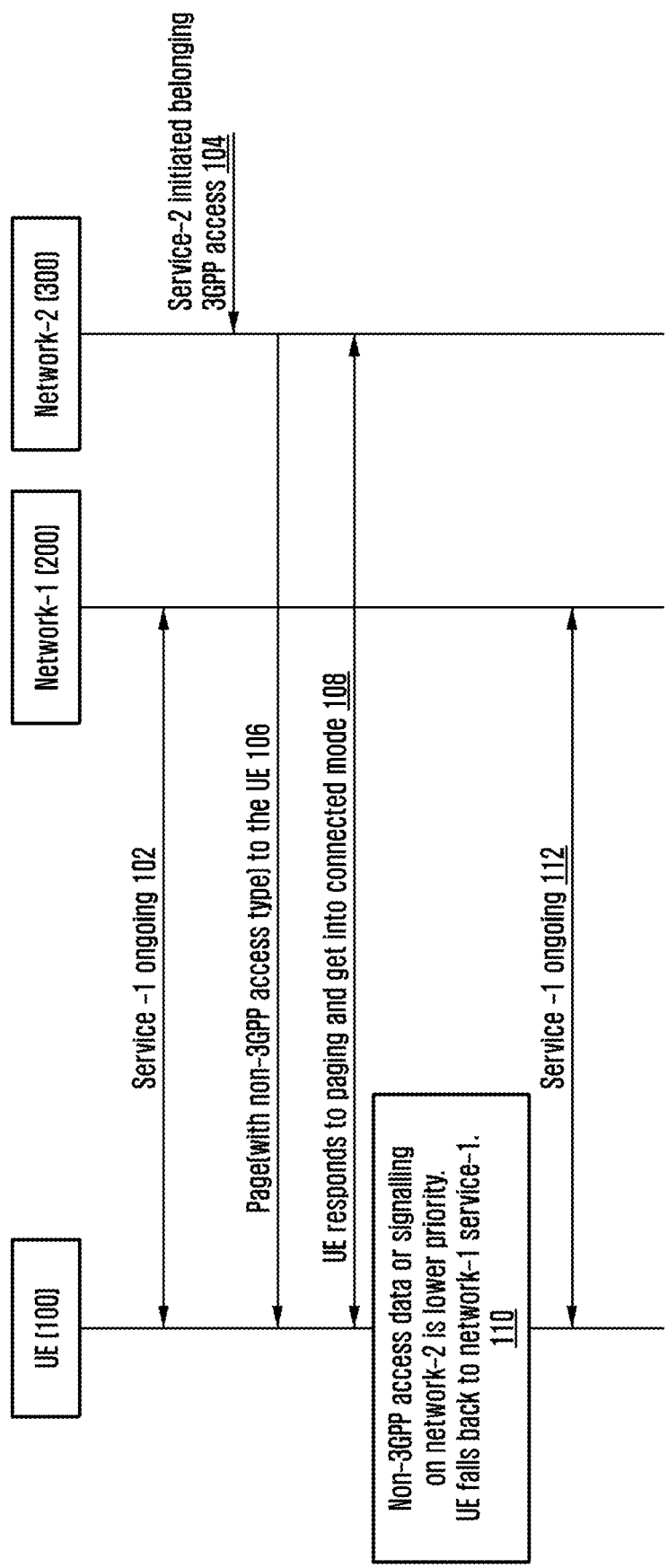
FIG. 2 is a sequence diagram illustrating paging message handling according to a prior art.

FIG. 2 is a sequence diagram illustrating paging message handling according to a prior art.

FIG. 2 is a sequence diagram illustrating how the UE responds to the paging message when the non 3GPP access type indication is received in the paging message, according to a prior art. As seen in FIG. 1, the UE is connected to network 1 via a SIM 1, whereas the SIM 2 is in an idle state over the 3GPP access and SIM 2 is also in the idle state over the non-3GPP access for example when the UE is not in the service area of the non-3GPP access. At 102, a service 1 is ongoing. At 104, a service-2 is initiated at SIM 2 by the network 2. The service-2 belongs to non-3GPPA (non-3GPP access). At 106, the SIM 2 of the UE receives a paging message from the network 2 wherein the paging message informs the UE that data or signaling to be received is about the non-3GPPA type i.e., the data or signaling is pending related to the PDU session of one of the non-3GPP access. At 108, the UE responds to the paging message and get into connected mode over the network-2 via the SIM 2. The UE stops the current service at first SIM, due to communication constraints of the UE for example by tuning away the receiver or transmitter and gets into connected mode at SIM-2. To get into connected mode at SIM-2 network the UE has to send the NAS message like service request and include Allowed PDU session status IE. The Allowed PDU sessions status IE indicates to the network the non-3GPP access PDU session(s) for which the UE allows the user-plane resources to be re-established over 3GPP access. The network transfers the allowed PDU sessions from non-3GPP access to 3GPP access and establishes the user plane resources on 3GPP access. The network then sends the pending downlink data or signaling message to the UE. At 110, the UE realizes that a non-3GPPA data or a signaling on the network-2 has lower priority as compared to the service ongoing at first SIM earlier. After realizing, the UE starts the service on first SIM again at 112 after aborting the service on SIM-2 network. Due to this on and off of service on first SIM, a throughput of service-1 is impacted, user experience is impacted because there was pause in the ongoing service on SIM-1 network, there was unnecessarily resources consumed for SIM-2 network i.e., SIM-2 network has to move the PDU sessions from non-3GPP access to 3GPP access and further establish the user-plane resources over 3GPP access, which eventually UE has ended up releasing.

Thus, it is desired to address the above-mentioned disadvantages or other shortcomings and provide a method and device for better handling of the paging message with non-3GPPA.

Although the FIG. 2 shows various hardware components of the paging message handler (140) but it may be understood that other embodiments are not limited thereon. In other embodiments, the paging message handler (140) may include less or more number of components. Further, the labels or names of the components are used only for illustrative purpose and does not limit the scope of the present disclosure. One or more components can be combined together to perform same or substantially similar function to handling paging messages.

FIG. 3A illustrates a sequence diagram illustrating a method of handling the paging message received on the second SIM of the UE according to an embodiment of the present disclosure.

As seen in FIG. 3A, the UE (100) is in communication with the first network (200). In an embodiment the UE (100) is connected with the first network (200) through the first SIM (150) over the 3GPPA.

In another embodiment, the UE (100) of the second network is in an idle mode over the 3GPPA and is in an idle mode over the non-3GPPA.

At 302A, the UE (100) is in communication with the first network (200) over the 3GPPA using the first SIM (150), whereas the second SIM (160) is not communicating with any network. At 304A, the UE (100) receives a paging message from the second network (300). The paging message is sent in response to the pending downlink user data. The paging message received comprises information about the non-3GPP access type indication.

At 306A, the UE (100) determines the priority of the paging message based on the information about the non-3GPPA type indication in the paging message received from the second network. Further the UE (100) compares the pending downlink data with the ongoing service at the first SIM (150) and determines whether the priority of the pending downlink data over non-3GPPA is greater than the ongoing service at the first SIM (150) over the 3GPPA. In the present embodiment, the UE (100) determines that the priority of the for the pending downlink data over non-3GPPA is lesser than the ongoing service at the first SIM (150) over the 3GPPA. Thus, the UE (100) ignores and does not respond to paging as the priority of the currently ongoing service on the first SIM (150) is greater than the non-3GPP access service pending to be delivered to the UE at 308A.

Figure 3B:
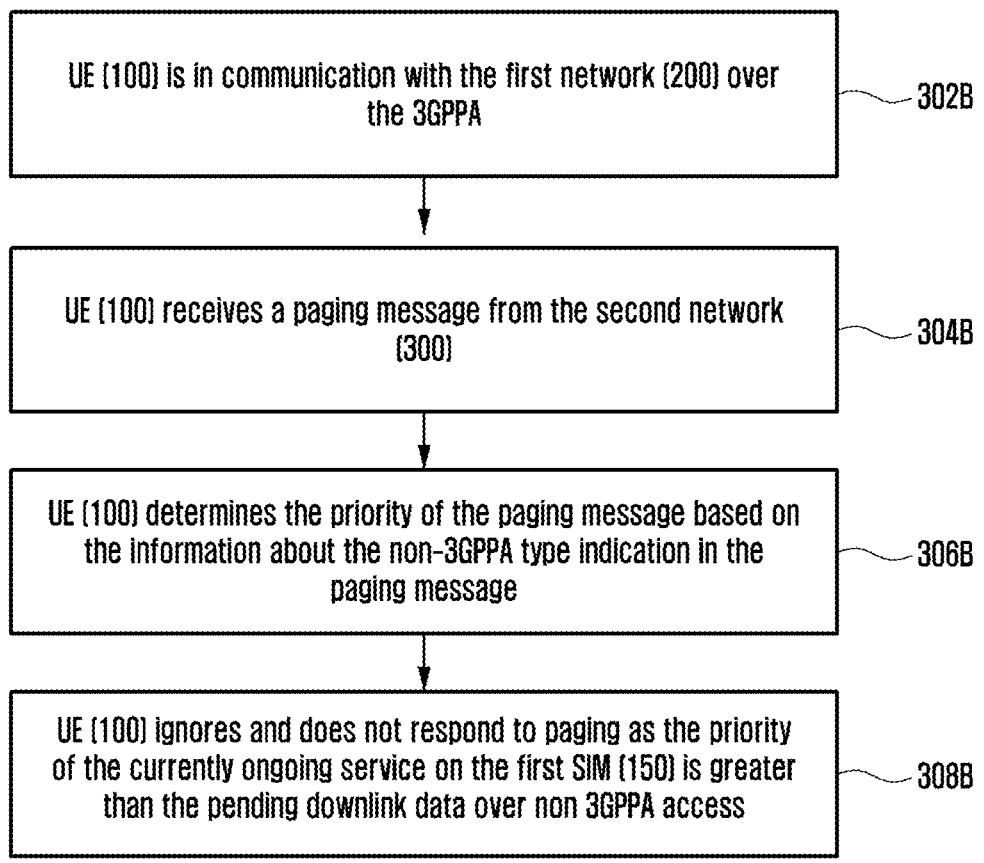
FIG. 3B illustrates a flow diagram illustrating a method of handling the paging message received on the second SIM of the UE according to an embodiment of the present disclosure.

FIG. 3B illustrates a flow diagram illustrating a method of handling the paging message received on the second SIM of the multi-SIM UE according to an embodiment of the present disclosure.

In the flow diagram, the UE (100) is in communication with the first network (200) and the second network (300). In an embodiment the UE (100) is in connected mode with the first network (200) through the first SIM (150) over the 3GPPA.

In another embodiment, the UE (100) for the second SIM network is in an idle mode over the 3GPPA and is in an idle mode over the non-3GPPA.

At 302B, the UE (100) is in communication with the first network (200) over the 3GPPA using the first SIM (150), whereas the second SIM (160) is not communicating with any network which indicates that the UE is in the idle mode at the second SIM over the 3GPP access (3GPPA) and non 3GPPA.

At 304B, the UE (100) receives a paging message from the second network (300). The paging message is sent in response to the pending downlink user data. The paging message received comprises information about the non-3GPP access type indication.

At 306B, the UE (100) determines the priority of the paging message based on the information about the non-3GPPA type indication in the paging message. Further the UE (100) compares the pending downlink data with the ongoing service at the first SIM (150) and determines whether the priority of the pending downlink data over non-3GPPA is greater than the ongoing service at the first SIM (150) over the 3GPPA. In the present embodiment, the UE (100) determines that the priority of the pending downlink data over non-3GPPA is smaller than the ongoing service at the first SIM (150) over the 3GPPA. Thus, the UE (100) ignores and does not respond to paging as the priority of the currently ongoing service on the first SIM (150) is greater than the pending downlink data of non-3GPPA at 308B.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the present disclosure.

FIG. 3C is a sequence diagram illustrating a method of handling the paging message received on the second SIM of the UE according to an embodiment of the present disclosure.

As seen in FIG. 3C, the UE (100) is in communication with the first network (200). In an embodiment the UE (100) is connected with the first network (200) through the first SIM (150) over the 3GPPA.

In another embodiment, the UE (100) of the second network is in an idle mode over the 3GPPA and is in an idle mode over the non-3GPPA.

At 302C, the UE (100) is in communication with the first network (200) over the 3GPPA using the first SIM (150), whereas the second SIM (160) is not communicating with any network. At 304C, the UE (100) receives a paging message from the second network (300). The paging message is sent in response to the pending downlink user data. The paging message received comprises information about the non-3GPP access type indication.

Figure 3D:
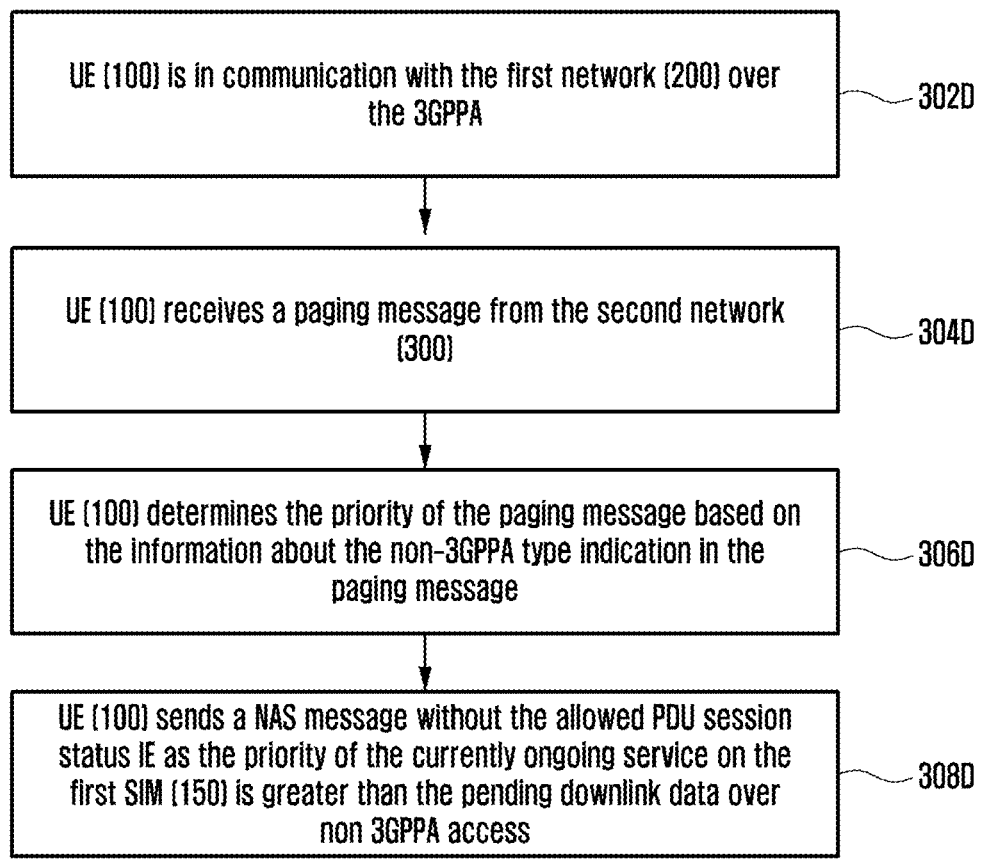
FIG. 3D illustrates a flow diagram illustrating a method of handling the paging message received on the second SIM of the UE according to an embodiment of the present disclosure.

At 306C, the UE (100) determines the priority of the paging message based on the information about the non-3GPPA type indication in the paging message received from the second network. Further the UE (100) compares the pending downlink data with the ongoing service at the first SIM (150) and determines whether the priority of the pending downlink data over non-3GPPA is greater than the ongoing service at the first SIM (150) over the 3GPPA. In the present embodiment, the UE (100) determines that the priority of for the pending downlink data over non-3GPPA is lesser than the ongoing service at the first SIM (150) over the 3GPPA. Thus, the UE (100) sends the NAS message to the second network, wherein the NAS message does not include the allowed PDU session status IE to indicate at least one PDU session of non-3GPP access for which the UE allows the user-plane resources to be re-established over 3GPP access at 308C. FIG. 3D illustrates a flow diagram illustrating a method of handling the paging message received on the second SIM of the UE, according to an embodiment as disclosed herein;

In the flow diagram, the UE (100) is in communication with the first network (200) and the second network (300).

In an embodiment the UE (100) is in connected mode with the first network (200) through the first SIM (150) over the 3GPPA.

In another embodiment, the UE (100) for the second SIM network is in an idle mode over the 3GPPA and is in an idle mode over the non-3GPPA.

At 302D, the UE (100) is in communication with the first network (200) over the 3GPPA using the first SIM (150), whereas the second SIM (160) is not communicating with any network which indicates that the UE is in the idle mode at the second SIM over the 3GPPA and non 3GPPA.

At 304D, the UE (100) receives a paging message from the second network (300). The paging message is sent in response to the pending downlink user data. The paging message received comprises information about the non-3GPP access type indication.

At 306D, the UE (100) determines the priority of the paging message based on the information about the non-3GPPA type indication in the paging message. Further the UE (100) compares the pending downlink data with the ongoing service at the first SIM (150) and determines whether the priority of the pending downlink data over non-3GPPA is greater than the ongoing service at the first SIM (150) over the 3GPPA. In the present embodiment, the UE (100) determines that the priority of the pending downlink data over non-3GPPA is smaller than the ongoing service at the first SIM (150) over the 3GPPA. Thus, the UE (100) sends the NAS message to the network, wherein the NAS message does not include an allowed PDU session status IE to indicate at least one PDU session of non-3GPP access for which the UE allows the user-plane resources to be re-established over 3GPP access at 308D.

Figure 4A:
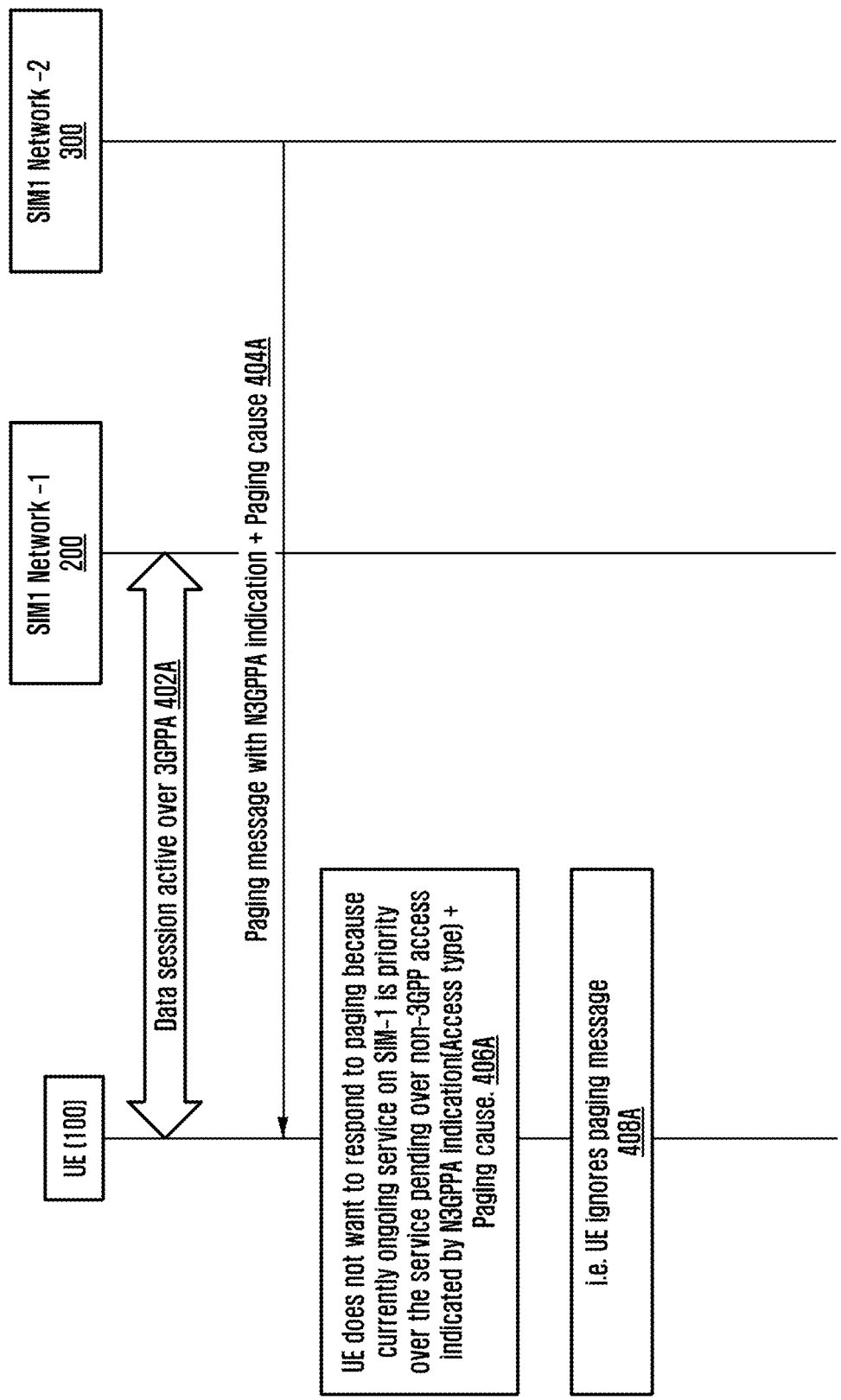
FIG. 4A illustrates a sequence diagram illustrating a method of handling the paging message received on the second SIM of the UE along with a paging cause according to an embodiment of the present disclosure.

FIG. 4A illustrates a sequence diagram illustrating a method of handling the paging message received on the second SIM of the UE along with a paging cause according to an embodiment of the present disclosure.

As seen in FIG. 4A, the UE (100) is in communication with the first network (200) and the second network (300). In an embodiment the UE (100) is connected with the first network (200) through the first SIM (150) over the 3GPPA.

In another embodiment, the UE (100) of the second SIM network is in an idle mode over the 3GPPA and is in an idle mode over the non-3GPPA.

At 402A, the UE (100) is in communication with the first network (200) over the 3GPPA using the first SIM (150), whereas the second SIM (160) is not communicating with any network i.e., the second SIM (160) is in the idle mode over both 3GPPA and non 3GPPA.

At 404A, the UE (100) receives a paging message from the second network (300). The paging message is sent in response to the pending downlink user data. The paging message received comprises information about the non-3GPP access type indication. The UE (100) also receives a paging cause from the second network (300). The paging cause includes information about the type of downlink user data pending over non-3GPP access.

At 406A, the UE (100) determines the priority of the paging message based on the information about the non-3GPPA type indication in the paging message and the paging cause. Further the UE (100) compares the pending downlink data with the ongoing service at the first SIM (150) and determines whether the priority of the pending downlink data over non-3GPPA is greater than the ongoing service at the first SIM (150) over the 3GPPA. In the present embodiment, the UE (100) determines that the priority of the pending downlink data over non-3GPPA is lesser than the ongoing service at the first SIM (150) over the 3GPPA. Thus, the UE (100) ignores and does not respond to paging as the priority of the currently ongoing service on the first SIM (150) is greater than the pending downlink data over non-3GPP access at 408A.

Figure 4B:
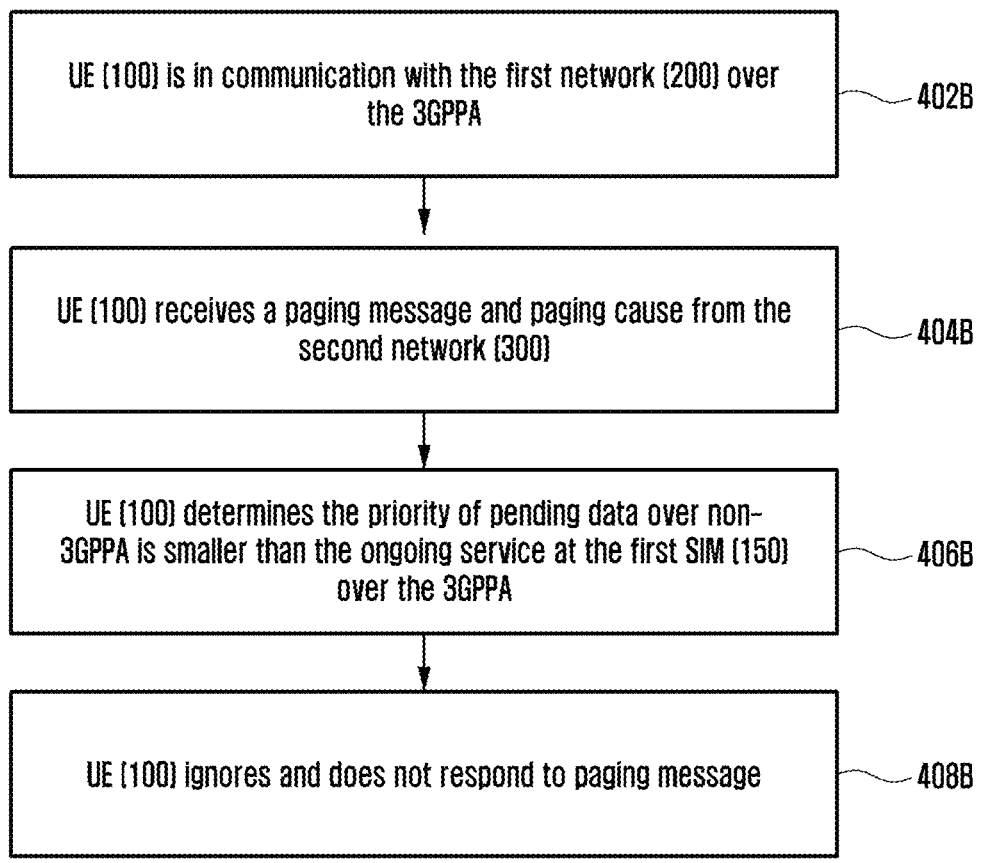
FIG. 4B illustrates a flow diagram illustrating a method of handling the paging message received on the second SIM of the UE along with a paging cause according to an embodiment of the present disclosure.

FIG. 4B illustrates a flow diagram illustrating a method of handling the paging message received on the second SIM (160) of the UE (100) according to an embodiment of the present disclosure;

In the flow diagram, the UE (100) is in communication with the first network (200) and the second network (300). In an embodiment the UE (100) is connected with the first network (200) through the first SIM (150) over the 3GPPA.

In another embodiment, the UE (100) of the second SIM network is in an idle mode over the 3GPPA and is in an idle mode over the non-3GPPA.

At 402B, the UE (100) is in communication with the first network (200) over the 3GPPA using the first SIM (150), whereas the second SIM (160) is not communicating with any network. At 404B, the UE (100) receives the paging message and the paging cause from the second network (300). The paging message is sent in response to the pending downlink user data. The paging message received comprises information about the non-3GPP access type indication. The paging cause includes information about the type of downlink user data pending.

At 406B, the UE (100) determines the priority of the paging message based on the information about the non-3GPPA type indication in the paging message. Further the UE (100) compares the pending downlink data with the ongoing service at the first SIM (150) and determines whether the priority of the pending downlink data over non-3GPPA is greater than the ongoing service at the first SIM (150) over the 3GPPA. In the present embodiment, the UE (100) determines that the priority of the pending downlink data over non-3GPPA is less than the ongoing service at the first SIM (150) over the 3GPPA. Thus, the UE (100) ignores and does not respond to paging as the priority of the currently ongoing service on the first SIM (150) is greater than the pending downlink data over non-3GPP access at 408B.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the present disclosure.

Figure 5A:
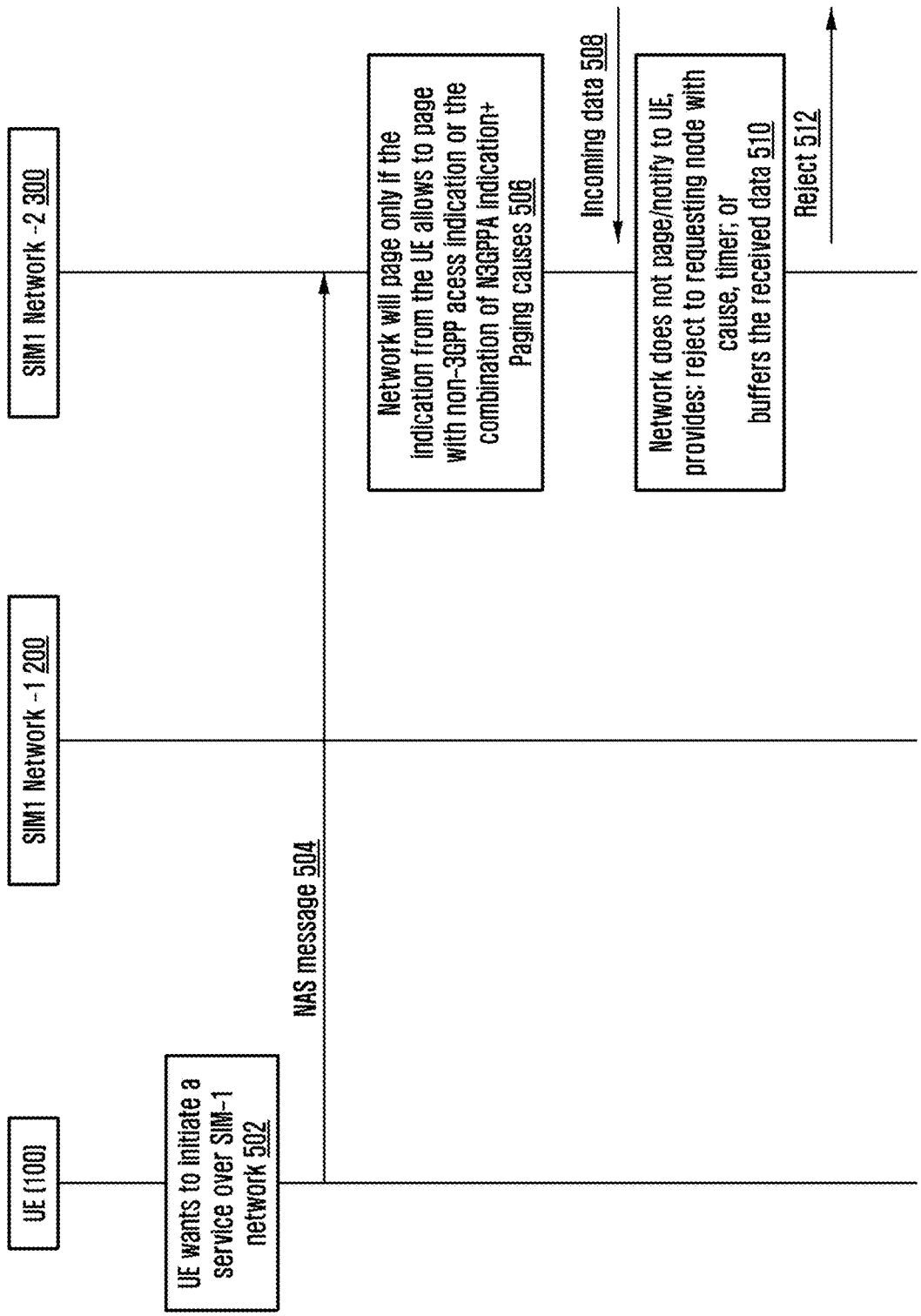
FIG. 5A illustrates a sequence diagram illustrating a method of handling the paging message received on the second SIM of the UE according to an embodiment of the present disclosure.

FIG. 5A illustrates a sequence diagram illustrating a method of handling the paging message received on the second SIM (160) of the UE (100) according to an embodiment of the present disclosure.

As illustrated in FIG. 5A, the UE (100) is not connected to the first network (200) and the second network (300) using the first SIM (150) and the second SIM (160). The UE (100) is in an idle mode over the 3GPPA and is in an idle mode over the non-3GPPA. In an embodiment, both the first SIM (150) and the second SIM (160) may be connected to the same network or different network.

At 502A, the UE (100) wants to initiate a service with the first network (200) over the 3GPPA using the first SIM (150), whereas the second SIM (160) is still not communicating with any network. In another embodiment, the UE (100) may be in connected mode over the second SIM (160).

At 504A, the UE (100) sends a NAS message to the second network (300) indicating the second network (300) whether the paging message with non-3GPPA indication is allowed or not allowed. In an embodiment, the UE (100) may send an AS message to the second network (300)

indicating the second network (300) whether the paging message with non-3GPPA type indication is allowed or not.

In an example embodiment, paging for non-3GPP access type+ paging cause is not allowed where the paging cause can be of values a, b which are not allowed. Which explains that except for paging cause values a, b all other paging cause values are allowed by the UE (100).

In another example, the paging cause having values a and b is only allowed. Such that except for paging cause having values a and b, all other paging cause values are allowed by the UE (100).

In an embodiment, the UE (100) may set a timer value for which the paging message and the paging cause with the non-3GPPA is not allowed. Similarly, the UE (100) may set a timer value for which the paging message and the paging cause with 3GPPA is allowed. For example, if the timer value is 5 min for not allowing the paging message and the paging cause with the non-3GPPA, then the second network (300) is not expected to page the UE (100) with access type non-3GPP access indication for 5 minutes. Similarly, if the timer value is 5 min for allowing the paging message and the paging cause with the non-3GPPA, then the second network (300) is expected to page the UE (100) with access type non-3GPP access indication only for 5 minutes.

Further, at 506A, the second network (300) send the paging message only if the indication from the UE (100) allows to page with non-3GPP access indication or the combination of N3GPPA indication+ Paging causes.

At 508A, the second SIM (160) receives an incoming data form the second network (300). At 510A, the second SIM (160) determines that paging with non-3GPPA type indication is not allowed and hence the paging message is not sent to the UE (100). At, 512A, the incoming data is rejected. Thus, uninterrupted service is ensured on the first SIM (150).

Figure 5B:
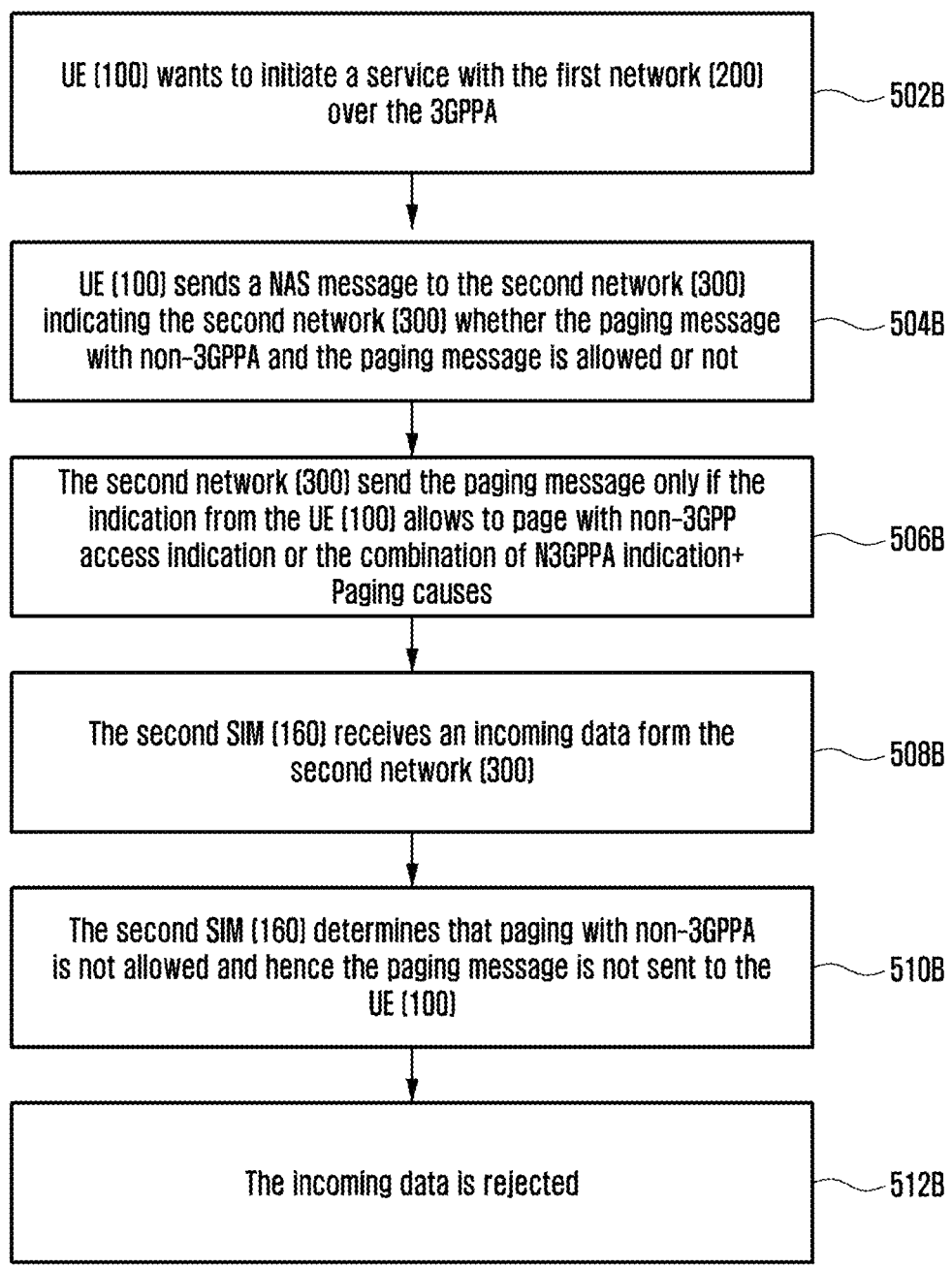
FIG. 5B illustrates a flow diagram illustrating a method of handling the paging message received on the second SIM of the UE according to an embodiment of the present disclosure.

FIG. 5B illustrates a flow diagram illustrating a method of handling the paging message received on the second SIM (160) of the UE (100), according to an embodiment as disclosed herein.

In the present embodiment, the UE (100) is not connected to the first network (200) and the second network (300) using the first SIM (150) and the second SIM (160). The UE (100) is in an idle mode over the 3GPPA and is in an idle mode over the non-3GPPA. In an embodiment, both the first SIM (150) and the second SIM (160) may be connected to the same network or different network.

At 502B, the UE (100) wants to initiate a service with the first network (200) over the 3GPPA using the first SIM (150), whereas the second SIM (160) is still not communicating with any network i.e., the second SIM (160) is in an mode. In another embodiment, the UE (100) may be in connected mode over the second SIM (160).

At 504B, the UE (100) sends a NAS message to the second network (300) indicating the second network (300) whether the paging message with non-3GPPA type indication is allowed or not. In an embodiment, the UE (100) may send an AS message to the second network (300) indicating the second network (300) whether the paging message with non-3GPPA type indication is allowed or not.

In an example embodiment, paging for non-3GPP access type+ paging cause is not allowed where the paging cause can be of values a and b which are not allowed. Which explains that except for paging cause values a and b, all other paging cause values are allowed by the UE (100).

In another example, the paging cause having values a and b is only allowed. Such that except for paging cause having values a and b, all other paging cause values are allowed by the UE (100).

In an embodiment, the UE (100) may set a timer value for which the paging message and the paging cause with the non-3GPPA is not allowed. Similarly, the UE (100) may set a timer value for which the paging message and the paging cause with 3GPPA is allowed. For example, if the timer value is 5 min for not allowing the paging message and the paging cause with the non-3GPPA type indication, then the second network (300) is not expected to page the UE (100) with access type non-3GPP access for 5 minutes. Similarly, if the timer value is 5 min for allowing the paging message and the paging cause with the non-3GPPA, then the second network (300) is expected to page the UE (100) with access type non-3GPP access only for 5 minutes.

Further, at 506B, the second network (300) send the paging message only if the indication from the UE (100) allows to page with non-3GPP access indication or the combination of N3GPPA indication+ Paging causes.

At 508B, the second SIM (160) receives an incoming data form the second network (300). At 510B, the second SIM (160) determines that paging with non-3GPPA is not allowed and hence the paging message is not sent to the UE (100). At, 512B, the incoming data is rejected. Thus, uninterrupted service is ensured on the first SIM (150).

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the present disclosure.

FIG. 6 is a flow diagram illustrating the method of handling paging message in a wireless communication network according to an embodiment of the present disclosure.

At 602, the UE (100) also termed as multi-SIM UE (100) receives the paging message from a network entity. In an embodiment the network entity may be from the first network (200) or the second network (300). The paging message is for the pending downlink data over the non-3GPPA.

At 604, the multi-SIM UE (100), determines whether to re-establish user-plane resources over a 3GPP access using at least one PDU session of the non 3GPP access based on the paging message. The flow proceeds to 606 in response to determining that the user-plane resources are to be re-established over a 3GPP access using at least one PDU session of the non 3GPP access based on the paging message. The flow proceeds to 608 in response to determining that the user-plane resources are not to be re-established over a 3GPP access using at least one PDU session of the non 3GPP access based on the paging message.

At 606, the multi-SIM UE (100) accepts the paging message in response to determining that the paging message is to be re-established over the 3GPP access using the at least one PDU session of the non-3GPP access. The multi-SIM UE (100) sends the non-access stratum (NAS) message to the network entity, wherein the NAS message comprises the allowed PDU session status information element to indicate the at least one PDU session of non-3GPP access for which the UE allows the user-plane resources to be re-established over 3GPP access.

At 608, the multi-SIM UE (100) does not respond to the paging message in response to determining the user-plane resources are not to be re-establish using at least one PDU session of the non-3GPP access over the 3GPP access.

In an embodiment the multi-SIM UE (100) ignores the paging message in response to determining the user-plane resources are not to be re-establish using at least one PDU session of the non-3GPP access over the 3GPP access at 608A.

In yet another embodiment, in response to determining the user-plane resources are not to be re-establish using at least one PDU session of the non-3GPP access over the 3GPP access, the multi-SIM UE (100) sends the NAS message to the network entity wherein the NAS message does not include an allowed PDU session status IE to indicate at least one PDU session of non-3GPP access for which the UE allows the user-plane resources to be re-established over 3GPP access at 608B.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a multi-subscriber identity module (M-SIM) user equipment (UE) in a wireless communication network, the method comprising:
    communicating with a first network entity over a $3^{rd}$ generation partnership project (3GPP) access using a first SIM;
    receiving, from a second network entity via a second SIM, a paging message over the 3GPP access for pending downlink data, wherein the paging message includes a non-3GPP access type indication;
    determining whether to re-establish user-plane resources over the 3GPP access using at least one protocol data unit (PDU) session of a non-3GPP access based on the paging message; and
    performing one of:
        responding to the paging message based on a determination that the user-plane resources are re-established over the 3GPP access using the at least one PDU session of the non-3GPP access; or
        not responding to the paging message based on a determination that the user-plane resources are not re-established over the 3GPP access using the at least one PDU session of the non-3GPP access.

2. The method as claimed in claim 1, wherein the M-SIM UE is in an idle state over the 3GPP access and the non-3GPP access.

3. The method as claimed in claim 1, wherein the non-3GPP access type indication is associated with the pending downlink data over the non-3GPP access.

4. The method as claimed in claim 1, wherein responding to the paging message comprises:
    sending a non-access stratum (NAS) message to the second network entity, and wherein the NAS message comprises an allowed PDU session status information element (IE) to indicate the at least one PDU session of the non-3GPP access for which the M-SIM UE allows the user-plane resources to be re-established over the 3GPP access.

5. The method as claimed in claim 1, wherein not responding to the paging message comprises:
    performing one of:
        ignoring the received paging message; or
        sending an NAS message to the second network entity, wherein the NAS message does not include an allowed PDU session status IE to indicate the at least one PDU session of the non-3GPP access for which the M-SIM UE allows the user-plane resources to be re-established over the 3GPP access.

6. The method as claimed in claim 1, wherein determining whether to re-establish user-plane resources over the 3GPP access using the at least one PDU session of the non-3GPP access based on the paging message comprises:
    comparing the pending downlink data with an ongoing service at the first SIM;
    determining whether a priority of the pending downlink data over the non-3GPP access is higher than a priority of the ongoing service at the first SIM over the 3GPP access; and
    performing one of:
        determining, based on the paging message, that the user-plane resources are re-established over the 3GPP access using the at least one PDU session of the non-3GPP access based on a determination that the priority of the pending downlink data over the non-3GPP access is higher than the priority of the ongoing service at the first SIM over the 3GPP access, or
        determining, based on the paging message, that the user-plane resources are not re-established over the 3GPP access using the at least one PDU session of the non-3GPP access based on a determination that the priority of the pending downlink data over the non-3GPP access is not higher than the priority of the ongoing service at the first SIM over the 3GPP access.

7. A multi-subscriber identity module (M-SIM) user equipment (UE) in a wireless communication network, the M-SIM UE comprising:
    memory;
    a processor; and
    a communicator coupled with the processor and the memory, the communicator configured to:
        communicate with a first network entity over a $3^{rd}$ generation partnership project (3GPP) access using a first SIM;
        receive, from a second network entity via a second SIM, a paging message over the 3GPP access for pending downlink data, wherein the paging message includes a non-3GPP access type indication;
        determine whether to re-establish user-plane resources over the 3GPP access using at least one protocol data unit (PDU) session of a non-3GPP access based on the paging message; and
        perform one of:
            responding to the paging message based on a determination that the user-plane resources are re-established over the 3GPP access using the at least one PDU session of the non-3GPP access, or
            not responding to the paging message based on a determination that the user-plane resources are not re-established over the 3GPP access using the at least one PDU session of the non-3GPP access.

8. The M-SIM UE as claimed in claim 7, wherein M-SIM UE is in an idle state over the 3GPP access and the non-3GPP access.

9. The M-SIM UE as claimed in claim 7, wherein the non-3GPP access type indication is associated with the pending downlink data over the non-3GPP access.

10. The M-SIM UE as claimed in claim 7, wherein the communicator, to respond to the paging message, is further configured to:
    send a non-access stratum (NAS) message to the second network entity, and wherein the NAS message comprises an allowed PDU session status information element (IE) to indicate the at least one PDU session of the non-3GPP access for which the M-SIM UE allows the user-plane resources to be re-established over the 3GPP access.

11. The M-SIM UE as claimed in claim 7, wherein the communicator, to not respond to the paging message, is further configured to:
    ignore the received paging message; or
    send an NAS message to the second network entity, wherein the NAS message does not include an allowed PDU session status IE to indicate the at least one PDU session of the non-3GPP access for which the M-SIM UE allows the user-plane resources to be re-established over the 3GPP access.

12. The M-SIM UE as claimed in claim 7, wherein the communicator, to determine whether to re-establish user-plane resources over the 3GPP access using the at least one PDU session of the non-3GPP access based on the paging message, is further configured to:
    compare the pending downlink data with an ongoing service at the first SIM;
    determine, whether a priority of the pending downlink data over the non-3GPP access is higher than a priority of the ongoing service at the first SIM over the 3GPP access; and
    perform one of:
        determining, based on the paging message, that the user-plane resources are re-established over the 3GPP access using the at least one PDU session of the non-3GPP access based on a determination that the priority of the pending downlink data over the non-3GPP access is higher than the priority of the ongoing service at the first SIM over the 3GPP access, or
        determining, based on the paging message, that the user-plane resources are not re-established over the 3GPP access using the at least one PDU session of the non-3GPP access based on a determination that the priority of the pending downlink data over the non-3GPP access is not higher than the priority of the ongoing service at the first SIM over the 3GPP access.

* * * * *